(12) United States Patent
Salyers et al.

(10) Patent No.: US 10,474,632 B2
(45) Date of Patent: *Nov. 12, 2019

(54) SEGMENTED HASHING FOR SECURE DATA MODIFICATION

(71) Applicant: Amazon Technologies, Inc., Seattle, WA (US)

(72) Inventors: David Carl Salyers, Seattle, WA (US); James Christopher Sorenson, III, Seattle, WA (US); Ankur Khetrapal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/640,890

(22) Filed: Jul. 3, 2017

(65) Prior Publication Data
US 2017/0308543 A1 Oct. 26, 2017

Related U.S. Application Data

(63) Continuation of application No. 13/665,709, filed on Oct. 31, 2012, now Pat. No. 9,697,217.

(51) Int. Cl.
*G06F 16/13* (2019.01)
*H04L 9/06* (2006.01)
(Continued)

(52) U.S. Cl.
CPC ............ *G06F 16/137* (2019.01); *G06F 3/065* (2013.01); *G06F 3/067* (2013.01); *G06F 3/0617* (2013.01);
(Continued)

(58) Field of Classification Search
CPC .............. G06F 16/137; G06F 16/2255; G06F 16/9014; G06F 16/152; G06F 3/06;
(Continued)

(56) References Cited

U.S. PATENT DOCUMENTS 7,130,956 B2 10/2006 Rao
7,340,652 B2 3/2008 Jarvis et al.
(Continued)

OTHER PUBLICATIONS

U.S. Appl. No. 13/212,960, filed Aug. 18, 2011, James Christopher Sorenson, III, et al.
(Continued)

*Primary Examiner* — Azizul Choudhury
(74) *Attorney, Agent, or Firm* — Robert C. Kowert; Meyertons, Hood, Kivlin, Kowert & Goetzel, P.C.

(57) ABSTRACT

Methods and apparatus for secure data modification using segmented hashing are disclosed. An intermediate device on a data path between a storage service and a client receives a modification request for a data segment of a data chunk of a storage object. The device generates a new chunk hash value for the chunk based on an original chunk hash value of the chunk, an original segment hash value of the segment to be modified, and a new segment hash value computed based on the modification. The device generates a modified version of the chunk based on the modification request, and uploads the modified version and the new chunk hash value to the storage service.

20 Claims, 11 Drawing Sheets

(51) Int. Cl.

| | | |
|---|---|---|
| *H04L 29/08* | (2006.01) | |
| *H04L 12/743* | (2013.01) | |
| *G06F 16/14* | (2019.01) | |
| *G06F 16/22* | (2019.01) | |
| *G06F 16/901* | (2019.01) | |
| *H04L 9/08* | (2006.01) | |
| *H04L 9/32* | (2006.01) | |
| *G06F 3/06* | (2006.01) | |
| *G06F 11/14* | (2006.01) | |

(52) U.S. Cl.
CPC ............ *G06F 3/0635* (2013.01); *G06F 11/14* (2013.01); *G06F 16/152* (2019.01); *G06F 16/2255* (2019.01); *G06F 16/9014* (2019.01); *H04L 9/06* (2013.01); *H04L 9/0643* (2013.01); *H04L 9/0891* (2013.01); *H04L 9/3236* (2013.01); *H04L 45/7453* (2013.01); *H04L 67/1065* (2013.01); *H04L 67/1097* (2013.01)

(58) Field of Classification Search
CPC ....... H04L 9/06; H04L 9/0643; H04L 9/0891; H04L 9/3236; H04L 67/1065; H04L 67/1097; H04L 45/7453
See application file for complete search history.

(56) References Cited

U.S. PATENT DOCUMENTS

| | | | |
|---|---|---|---|
| 7,624,170 B2 | 11/2009 | Das et al. | |
| 7,734,598 B2 * | 6/2010 | Noguchi | G11B 20/00086 707/690 |
| 7,797,323 B1 | 9/2010 | Eshghi et al. | |
| 8,019,882 B2 * | 9/2011 | Rao | H04L 9/3236 709/203 |
| 8,112,477 B2 | 2/2012 | Rao et al. | |
| 9,697,217 B1 | 7/2017 | Salyers | |
| 2003/0188180 A1 | 10/2003 | Overney | |
| 2010/0125730 A1 | 5/2010 | Dodgson et al. | |
| 2010/0146074 A1 | 6/2010 | Srinivasan | |
| 2010/0290422 A1 | 11/2010 | Haigh et al. | |
| 2013/0226888 A1 | 8/2013 | Govind et al. | |

OTHER PUBLICATIONS

U.S. Appl. No. 13/174,140, filed Jun. 30, 2011, James Christopher Sorenson, III, et al.

U.S. Appl. No. 13/174,505, filed Jun. 30, 2011, James Christopher Sorenson, III, et al.

Storsimple, "Cloud-integrated Enterprise Storage," downloaded from www.storsimple.com/total-storage/ on Oct. 22, 2012, 1 pages.

Nasuni Corporation, "What is Nasuni?," downloaded from www.nasuni.com/what_is_nasuni on Oct. 22, 2012, pp. 1-2.

TwinStrata, Inc., "CloudArray® Cloud Storage Gateway Overview," downloaded from www.twinstrata.com/CloudArray-overview on Oct. 22, 2012, pp. 1-2.

* cited by examiner

Determine source data segments: 601

Example source "chunk" = 000102030405060708090A0B0C0D0E0F10111213 (40 hexadecimal symbols; two hexadecimal symbols can be represented by one byte);

$S\_seg$ = 4 bytes (8 hex characters)

Therefore, N = 5, and source data segments $S_j$, for j = 0..4 are:
$S_0$ = 00010203, $S_1$ = 04050607, $S_2$ = 08090A0B, $S_3$ = 0C0D0E0F, $S_4$ = 10111213

Apply hash function to determine H1 values: 604

Example hash function F (chosen to simplify explanation) is identity function, so data doesn't change (i.e., F(x) = x); hash value size $S\_hash$ = 4 bytes;

Therefore, $H1_j$, j = 0..4 are:
$H1_0$ = 00010203, $H1_1$ = 04050607, $H1_2$ = 08090A0B, $H1_3$ = 0C0D0E0F, $H1_4$ = 10111213

Multiply by constant based on segment offset within source data, determine H2 values: 607

Example multiplication constant $C_j$:
(for j > 0) $C_j$ = 7*j (use product of small prime and segment offset);
(for j = 0) no multiplication performed Therefore, $H2_j$, j = 0..4 are:
$H2_0$ = 00010203, $H2_1$ = 1C232A31, $H2_2$ = 707E8C9A, $H2_3$ = FD12273B, $H2_4$ = 01C1DDFA14

Bitwise folding of H3 values for any H2 values that exceed S_hash size (4 bytes): 610

Only $H2_4$ exceeds 4 bytes, so fold first byte (01) by adding 01 to remaining bytes C1DDFA14 to obtain $H3_4$ = C1DDFA15; all other H3 values remain the same as corresponding H2 values.

Therefore, $H3_j$, j = 0..4 are:
$H3_0$ = 00010203, $H3_1$ = 1C232A31, $H3_2$ = 707E8C9A, $H3_3$ = FD12273B, $H3_4$ = C1DDFA15

( From 610, FIG. 6A )

Determine H4 values by bitwise rotating each H3 value by j (i.e., segment offset) bits:     613

For example, $H3_1$ =1C232A31, or (in binary) 0001 1100 0010 0011 0010 1010 0011 0001
    Rotating H31 by 1 bit, we get (in binary) 0011 1000 0100 0110 0101 0100 0110 0010
    which, in hexadecimal, is 38465463

Therefore, $H4_j$, j = 0..4 are:
$H4_0$ = 00010203, $H4_1$ =38465463, $H4_2$ = 707E8C9A, $H4_3$ = C1FA3269, $H4_4$ = 1DDFA15C

---

616
Obtain final hash value H-chunk for source chunk by combining H4 segment hash values, e.g., using exclusive-or:

Therefore, H_chunk = $H4_0$ XOR $H4_1$ XOR $H4_2$ XOR $H4_3$ XOR $H4_4$
= 00010203 XOR 38465463 XOR 707E8C9A XOR C1FA3269 XOR 1DDFA15C
= 941C49CE

*FIG. 6B*

SEGMENTED HASHING FOR SECURE DATA MODIFICATION

This application is a continuation of U.S. patent application Ser. No. 13/665,709, filed Oct. 31, 2012, now U.S. Pat. No. 9,697,217, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As another example, virtualization technologies may allow data storage hardware maintained at a remote, network-accessible storage service to be shared among multiple users. Each user or client may be provided with a virtualized data store which may be distributed across multiple data storage devices, with each such virtualized data store acting as a distinct logical data store that provides clients with the illusion that they are the sole operators and administrators of the data storage resources. Using such storage virtualization techniques, it may be possible for some clients to reduce the capital and management expenses associated with maintaining large amounts of data storage on client premises. Storing or replicating client data at remote storage services may also provide other benefits such as simplified backup and/or easier disaster recovery. In some scenarios, the programmatic interfaces used for reading and writing data at the remote storage service may differ from the interfaces supported for client I/Os—for example, data at the remote storage service may be organized in larger units than typical client I/O operations, or the storage protocol used at the remote storage service may differ from some of the protocols supported for client I/O. Accordingly, in such scenarios, client-initiated write operations may need to be coalesced or translated, e.g., at an intermediate device that receives the written data from the client on a data path to the storage service, before the written data is persisted at the storage service. Such data path operations may under some circumstances result in difficult-to-detect data corruption.

BRIEF DESCRIPTION OF DRAWINGS

FIG. 6A and FIG. 6B collectively illustrate a use of the techniques illustrated in FIG. 5 on a small example data set, according to at least some embodiments.

Figure 1:
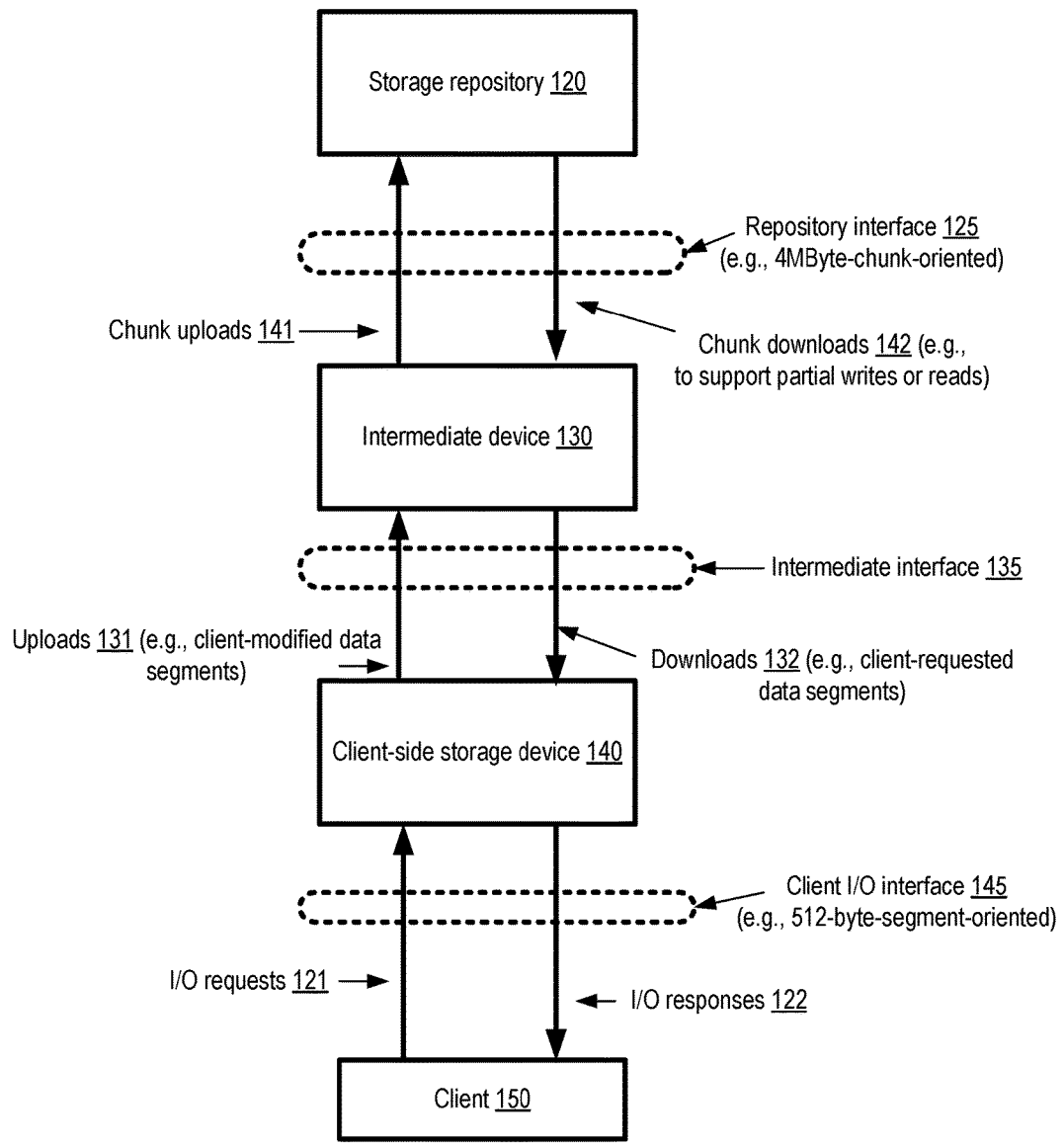
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for secure data modifications using segmented hashing are described. A network-accessible storage service or storage repository may allow clients to store arbitrary amounts of client data with certain service-level agreements regarding availability, performance, supported programmatic interfaces (APIs) and the like. In one embodiment, a client-side storage device, such as an intelligent storage appliance resident in a client network, may receive input/output (I/O) operations including reads and writes directed to storage objects of a remote network-accessible storage service. The remote storage service may also be referred to herein as a a "data store" or a "data repository". The storage object (which may comprise terabytes or even petabytes of client data in some cases) may be organized as a plurality of relatively large sub-units at the storage service in some embodiments. For example, in some implementations where unique keys are used to access units of the data, each key may be used to refer to a four megabyte "data chunk" of a storage object, since using smaller chunks may lead to excessive overhead for the keys themselves. The terms "data chunk" or "chunk" may be used herein to refer to the sub-units into which storage objects are organized at a storage service or storage repository.

In contrast to the chunk-based interfaces that may be supported natively by the storage service, the programmatic interfaces supported for client I/O may allow reads or writes directed at smaller data units, e.g., to any desired 512-byte-aligned segment of the storage object. Thus, the minimum data unit typically handled by the storage service may be many times larger than the minimum client-addressable data unit. The terms "segment" or "data segment" may be used herein to refer to the minimum client-addressable unit of data of the storage object of the storage service; thus, a given chunk of a storage object may comprise a plurality of segments. A client may, in a given modifying I/O operation in one implementation, write to a single 512-byte segment of a given 4000-kilobyte data chunk (the chunk may thus comprise as many as 8000 segments in such an example). In order to make the client's modifications persistent, the containing chunk to which the write is directed may have to be retrieved from the storage system, and the modified segment may have to be merged with the remainder of its containing chunk before the chunk is written back to the storage service. In at least some embodiments, intermediate devices may be employed for such merge operations and/or other data staging operations, along a data path between a client-side storage device (such as a storage appliance installed at a client's data center) and the storage service. Such intermediate devices or servers may also be referred to herein as "data-plane" devices or servers, as they may be designated primarily for data transfers between the storage service and the clients, as opposed to "control-plane" devices or servers that may be used primarily for administrative or configuration operations. Such intermediate devices may be linked in some embodiments via relatively high-performance network links to the storage service, and by a different (potentially relatively low performance) network such as a wide area network (WAN) to the client-side storage devices.

According to some embodiments, when a client modifies one or more segments S of a chunk C, an intermediate device may be responsible for retrieving the original corresponding chunk C from the storage service, merging or applying the client's modifications into C, and transmitting the modified chunk C back to the storage service. In at least some embodiments, e.g., to help reduce chances of undetected data corruption, the storage service may store respective hash values (or checksums) for each data chunk of each storage object. When a data chunk is transmitted from the storage service, or to the storage service, in such embodiments, a corresponding chunk hash value may also be transmitted, so that the validity of the data may be checked by the recipient. In such embodiments, the intermediate device may also be responsible for generating the new chunk hash value for the modified chunk. Under some conditions (e.g., due to unanticipated race conditions or bugs in the software being used), it may be possible that when the intermediate device merges the client's modifications into the original chunk, or during other operations at the intermediate device, data may get corrupted. If the intermediate device is unable to detect such a data corruption, a new hash value may be generated for the now corrupted data chunk, and sent back to the storage service, which may result in the corrupted data being written to as the authoritative or primary version of the data chunk. Accordingly, in some embodiments, a technique for handling client-initiated writes that would result in the detection of such data corruption may be used at the intermediate device.

According to such a technique, in one embodiment the intermediate device may receive a modification request directed to one or more data segments of a particular data chunk of a storage object of the storage service. The intermediate device may retrieve the targeted data chunk and its original hash value from the storage service. Then, in such an embodiment, the intermediate device may generate a new chunk hash value for the particular data chunk based at least in part on (a) the original chunk hash value for the particular data chunk, (b) a set of original segment hash values for the one or more data segments to which the modification request is directed, and (c) a set of new segment hash values computed based on modifications indicated in the modification request. Thus, the new chunk hash value may not be determined directly from the merged version of the chunk, instead, an alternative hash value computation scheme that relies on hash values of the affected segments may be used in such embodiments. The mathematical properties of the alternative hash value computation technique may in some embodiments allow the contribution of a given segment to the chunk hash value to be logically "subtracted" or eliminated, and the contribution of a replacement segment to the logically "added" to the chunk's hash value. Thus, given an original chunk hash value CHV1, an original segment hash value SHV1, and a new segment hash value SHV2, the new chunk hash value CHV2 may be computed by (a) logically eliminating the contribution of SHV1 to CHV1 and (b) logically adding the contribution of SHV2 to the result of step (a). A number of different types of mathematical or logical operations may be included in the computation of the new chunk hash value in some implementations, as described in greater detail below—e.g., a multiplication of an intermediate hash value of a given segment by the segment offset value (the position of the segment within the chunk, relative to other segments of the chunk), a bit-wise rotation, and/or bit-wise folding of intermediate hash values that exceed a certain size may be used.

In addition to generating the new chunk hash value, the intermediate device may also be responsible for merging the modified data with the original chunk, to arrive at a modified version of the chunk. In some embodiments, the intermediate device may be configured to validate the modified version of the chunk—e.g., by computing an additional hash value using a set of computations that use the modified chunk as an initial input, and ensuring that this additional hash value matches the new chunk hash value computed earlier (using computations on the original chunk hash value and the hash values of the affected segments). Thus, if data corruption occurred during the merge, the validation step would be expected to detect the corruption in such embodiments, since the hash value computed form the merged chunk would differ from the hash value computed from the original chunk hash value (except under the exceedingly unlikely circumstances when the same hash value is obtained from both sets of computations). The intermediate device may transmit the new chunk hash value and the modified, validated version of the chunk back to the storage service.

In at least some embodiments, the storage service and/or the client-side storage device may also use segmented hashing in a manner similar to that used for determining the new chunk hash value as described above. That is, segmented hashing may be used whenever a hash value for a portion or all of a storage object is to be computed. The client-side storage device that initially receives client I/O requests may determine a hash value for the segment(s) modified by a client in a given write request, and transmit the hash value for the combined modifications to the intermediate device in some embodiments. The intermediate device may use the received hash value to validate the modified segments in such embodiments. Similarly, the storage service may use the segmented hashing approach to determine the original chunk hash values in some embodiments (e.g., in embodiments where the storage object was initially provided to the storage service without corresponding chunk hash values, or if chunk hash values have to be re-calculated for some reason).

In at least some embodiments, an additional optimization may be employed when a chunk hash value is to be computed for an initial write to a previously-empty chunk. As a default, empty segments of a chunk may be populated with zeroes or some other specific values. Segment hash values for all the empty or zero-valued segments of a chunk, and a chunk hash value for the empty chunk as a whole, may be pre-computed in some embodiments. When a write request addressed to a particular segment S is received, the intermediate device may check whether the parent chunk C of S was previously empty. If the chunk C was empty, the pre-computed hash values for the empty chunk and the empty segments may be used to determine the new chunk hash value, thereby avoiding at least some computation overhead in such embodiments.

In some embodiments, the segment hash values that are computed as part of the process described above for responding to client-initiated write operations may also be used for other purposes than the elimination of undetected data corruption. For example, the client-side storage device or appliance may attempt to reduce the amount of data it has to send to the intermediate device by using the segment hash values for de-duplication. The already-computed segment hash value for a given segment S may be sent to the intermediate device to determine if the intermediate device already has a copy of the segment, for example. In such a scenario, if a lookup by the intermediate device in its de-duplication dictionary indicates that the segment S is already present at the intermediate device and/or at the storage service, the transmission of S from the client-side storage device may be avoided.

Example System Environments

FIG. 1 illustrates an example system environment, according to at least some embodiments. In the depicted system, a client 150 may create and access objects stored at a repository 120. The client 150 may submit I/O requests 121 via a client I/O programmatic interface 145 to a client-side storage device 140 (such as a storage gateway appliance of the type illustrated in FIG. 2 as described below), and receive responses 122 from the client-side storage device 140. The client I/O interface may define, for example, a number of different APIs that are supported for I/O, and the granularity or data units in which reads or writes may be performed. For example, in one embodiment, clients 150 may be allowed to submit reads and writes directed to one or more 512-byte aligned segments. Depending on the nature and size of the I/O request from the client 150, the client-side I/O request may result in one or more uploads 131 and/or downloads 132 initiated or requested by the client-side storage device 140. An upload may comprise, for example, data modified by the client 150, which is to be saved in the storage repository. A download may comprise, for example, portions of a storage object that the client 150 wishes to read.

In the depicted embodiment, the client-side storage device 140 may direct the uploaded data to, and receive the downloaded data from, an intermediate device 130, via an intermediate programmatic interface 135. The intermediate device 130 may serve as a staging or forwarding platform in a data path between the client-side storage device 140 and the storage repository 120, at which data received from the client-side storage device is collected for forwarding to the storage repository, and at which data received from the storage repository is collected for forwarding to the client-side storage device. In the depicted embodiment, data may be transferred between the storage repository 120 and the intermediate device 130 in different units than the units supported by the client I/O interface 145. For example, the repository interface 125 may support transfers in relatively large chunks, such as 4-megabyte chunks, while the client I/O interface 145 may allow reads and writes to be addressed to 512-byte segments.

When the client 150 submits an I/O request that includes a write operation directed to a particular segment S of a chunk C, the client-side storage device 140 may transmit the modified contents of S in an upload 131 to the intermediate device. The intermediate programmatic interface 135 may support various APIs and various sizes of data transfers in different embodiments; for example, in one simple scenario, the intermediate interface 135 may support the same data units as the client I/O interface 145. The client-side storage device 140 may comprise local storage space (such as a collection of disk devices or storage arrays) in some embodiments in which copies of the client's data can be stored for faster access than if all of the client's I/Os required access to the storage repository. In one embodiment, depending on various factors such as the functionality supported at the client-side storage device 140 or the amount of local storage available, the modified contents of S may be written to local storage of the client-side storage device when the I/O request is received. The upload of the client's data modifications may be initiated asynchronously with respect to the client's I/O request in some embodiments (e.g., a response to the client's I/O request may be provided before the modifications are uploaded), while in other embodiments, the upload to the intermediate device 130 may be initiated synchronously with respect to the client's I/O request.

When the intermediate device 130 receives modified segments of chunk C specified in the client's write request, the chunk (i.e., the current version of C from the perspective of the storage repository) may be downloaded from the storage repository 120. The chunk C may have to be downloaded because the storage repository may only be configured to accept writes (e.g., via repository interface 125) in units of chunks, and not in smaller amounts, in the depicted embodiment. Thus, a chunk download may be required even when the client submits a write request. Of course, a chunk may also have to be downloaded to the intermediate device when the client submits a request to read a segment of the chunk. In some embodiments, the intermediate device 130 may be configured to store or cache downloaded or uploaded data on its own persistent storage, while in other embodiments the intermediate device 130 may not be configured to store the uploaded/downloaded data on persistent storage, and may instead only stage the data, in volatile memory, using the in-memory data to perform any needed computations such as hash value calculations.

In at least some embodiments, in response to a client modification request, the intermediate device 130 may also download an original chunk hash value or checksum from the storage repository, corresponding to the unmodified version of chunk C. The original chunk hash value may have been generated earlier by the intermediate device itself (e.g., when C was last written to), or the original chunk hash value may have been generated at the storage repository in some embodiments. In at least some embodiments, a segment-based hashing scheme in which the chunk hash value is derived from a combination of hash values computed for its component segments (as described below with respect to FIG. 5) may be used for generating the original chunk hash value at either the intermediate device or the storage repository. The original chunk hash value may be used at the intermediate device 130 to validate that the chunk C has not been corrupted during its transfer from the storage repository 120 in some embodiments.

In response to the client's write, the intermediate device 130 may thus obtain (a) the original chunk C (b) the modified segments and (c) the original chunk hash value for C in the depicted embodiment. From within the chunk C, the intermediate device 130 may extract the original segments corresponding to (i.e., located at the same offsets within C as) the modified segments. For example, in an implementation in which each chunk comprises 4 megabytes and each segment comprises 512 bytes, consider a client write request directed to segment $S_2$ starting at offset 1024 bytes (i.e., the third 512-byte segment from the start of the chunk). The offset of a given segment within a chunk, expressed in units of segments rather than bytes, may be referred to herein as the "segment offset" within the chunk. Thus, with 512-byte segments, the first segment (at offset 0 bytes within the chunk) may be referred to as having segment offset "0", the second segment (at offset 512 bytes from the start of the chunk) may be referred to as having segment offset "1", the third a segment at offset 1024 bytes may be described as having a segment offset of "2", and so on. Accordingly, in response to receiving the client-modified $S_2$ segment, the original segment at segment offset "2" may be extracted from the original chunk C at the intermediate device. The intermediate device 130 may compute the segment hash values for the original segment(s) and the modified segment(s), using the same types of computation steps as were used to generate segment hash values for obtaining the original chunk hash value.

The intermediate device may then compute a new chunk hash value using (a) the original chunk hash value (b) the original segment hash values for the segments that to be replaced as a result of the client's request and (c) the new segment hash values corresponding to the modified segments in the depicted embodiment. For example, in one implementation, the impact of an original segment on the original chunk hash value may be eliminated by performing an exclusive-or (XOR) operation as follows: (intermediate chunk hash value)=(original chunk hash value XOR original segment hash value). Then, in such an implementation, the new chunk hash value may be computed from the intermediate chunk hash value by another XOR, as follows: (new chunk hash value)=(intermediate chunk hash value XOR new segment hash value). Since the XOR operation is commutative, these operations may be performed in any order to arrive at the new chunk hash value. In some embodiments, a single multi-operand XOR may be employed instead of a sequence of two-operand XORs, e.g., the new chunk hash value may be obtained as: (new chunk hash value)=(original chunk hash value XOR original segment hash value XOR new segment hash value). Logical or mathematical operations other than XOR may be use in some implementations. The intermediate device 130 may compute the new chunk hash value prior to, or independently of, merging the client's modifications with the original chunk C in the depicted embodiment.

The client's modifications may then be applied to the original chunk C at the intermediate device 130, e.g., by replacing the original segment(s) with the client-modified segment(s) to arrive at a modified version of chunk C. In at least some embodiments, for example in order to quickly detect whether any data corruption occurred during the merge, the intermediate device 130 may compute another chunk hash value, this time starting with the modified (i.e., post-merge) version of C. If this additional chunk hash value matches the new chunk hash value generated as described above, the likelihood of a data corruption may be considered to be negligible. The modified chunk C and the new chunk hash value may be transmitted to the storage repository 120 from the intermediate device 130. If the two chunk hash values do not match, this may be deemed an indication of an error, or of data corruption. Depending on the implementation, different error responses may be implemented—e.g., in one implementation, the merge may be retried, the computation of the new chunk hash value may be retried, the original hash value for the chunk may be re-downloaded, the original chunk may be re-downloaded, and/or an error log entry may be generated.

Figure 2:
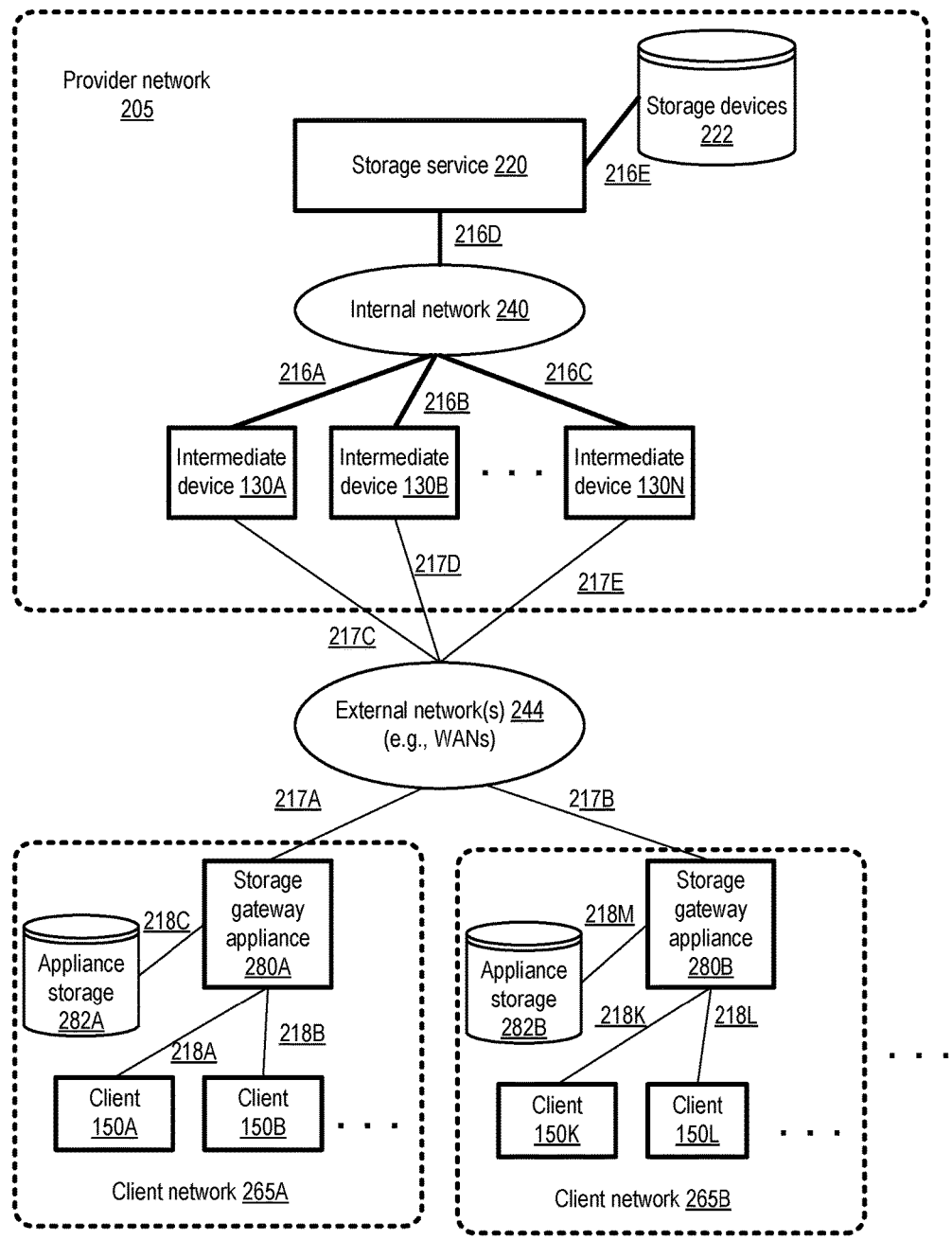
FIG. 2 illustrates another example system environment, in which intermediate devices form part of a data path between storage gateway appliances of client networks and a remote storage service, according to at least some embodiments.

FIG. 2 illustrates another example system environment, in which intermediate devices 130 (e.g., 130A-130N) form part of a data path between storage gateway appliances 280 of client networks 265 and a remote storage service 220, according to at least some embodiments. The storage service 220 may be considered analogous to (or an example of) the storage repository 120 of FIG. 1, and the storage gateway appliances 280 may be considered analogous to (or an example of) the client-side storage device 140 of FIG. 1. To avoid clutter, programmatic interfaces (similar in concept to the interfaces 125, 135 and 145 of FIG. 1) are not shown in FIG. 2.

The system of FIG. 2 comprises a provider network 205 in which the storage service 220 is implemented, as well as a collection of storage gateway appliances 280 and the intermediate devices 130. The storage service 220 may be responsible for storing client storage objects (such as volumes, file systems, and the like) in storage devices 222, and providing access to the storage objects to clients 150 (e.g., clients 150A, 150B, 150K and 150L) via network connections. Each client 150 may have access to a collection of computing devices of a corresponding client network 265—e.g., clients 150A and 150B have access to client network 265A, and clients 150K and 150L have access to client network 265B in the depicted embodiment. Each client network 265, whose devices may be located in a corresponding client data center or set of data centers, may include one or more storage gateway appliances 280, such as storage gateway appliance 280A in client network 265A, and storage gateway appliance 280B in client network 265B. In the depicted embodiment, each storage gateway appliance 280 may be configured to store subsets or all of the contents of client storage objects (whose primary copies are stored in storage devices 222 of the storage service 220) using respective appliance storage 282, e.g., appliance storage 282A of storage gateway appliance 280A and appliance storage 282B of storage gateway appliance 280B. Appliance storage 282 may include, for example, a plurality of disks and/or other storage devices, some of which may be used for storing or caching data chunks of client storage objects such as volumes, while other may be used for write logs (snapshot storage) or for other purposes.

A storage gateway appliance 280 may be configured to download data from, and upload data to, the storage service 220 on behalf of clients 150, with the help of the intermediate devices 130, over a combination of network links in various embodiments. In the depicted embodiment, network links 217 (e.g., link 217A, 217B, 217C, 217D and 217E) may be used for communications between the storage gateway appliances 280 and the set of intermediate devices 130 of the provider network. Links 217 may be part of an external network 244, which may include at least some relatively low-performance links such as WAN links. Within the provider network 205, intermediate servers or devices 130 may be able to utilize an internal network 240 to communicate with storage service 220, e.g., over high-performance dedicated network links 216 (e.g., links 216A, 216B, 216C or 216D). Similarly, high-speed links 216E may be used to store data to, or retrieve data from, the storage devices 222 of the storage service 220 in some implementations. A different set of links 218 (which may also support higher performance than the external network 244) may be used within the client networks 265, such as links 218A, 218B, 218C, 218K, 218L, and 218M.

In some embodiments, a client 150 may create a storage object at the service 220, such as a storage volume, using one or more administrative interfaces (such as service consoles implemented via web sites or web pages) not shown explicitly in FIG. 2. For a given volume, a client 150 may indicate the size of the disk space to be used for local storage at the appliance storage 282 of its storage gateway appliance 280. For example, in one embodiment, a volume of size 10000 Gigabytes (GB) may be created at storage service 220 by a client 150A (such as an administrator of a client network 265), and a local disk cache with a maximum size of 1000 GB may be established at appliance storage 282A. In another embodiment, local storage sufficient to store the entire volume may be required—e.g., 10000 GB of local storage at appliance storage 282A may be needed for a 10000 GB volume created at the storage service.

In a manner analogous to that described above with respect to FIG. 1, in some embodiments clients 150 of FIG. 2 may be permitted to submit I/Os directed to relatively small segments of a storage object of storage service 220, while the storage service 220 may organize the storage objects in larger chunks, and allow reads and writes in units of chunks rather than in units of segments. In one implementation, for example, chunks of size 4-megabytes may be implemented, while clients 150 may be allowed to submit I/O requests to 512-byte aligned segments within the chunks. Other chunk sizes and segment sizes may be used in other implementations. When a client 150 submits a write request to a storage gateway appliance 180, directed to one or more segments of a chunk C of a storage object, the modified segment(s) may be stored at least temporarily in the local appliance storage 282 in some embodiments, and the modifications may be uploaded to the storage service 220 via a selected intermediate device 130. The upload may be asynchronous or asynchronous with respect to the completion of the client's I/O request in various embodiments. In different embodiments, any of various techniques may be used to identify a particular intermediate device 130 to be used for a particular client request. For example, in some embodiments, a set of one or more intermediate devices 130 may be assigned for data transfers between a given storage gateway appliance 280 and the storage service 220, for all the storage objects managed using that appliance. In other embodiments, a different intermediate device 130 may be selected for each data transfer, e.g., based on current workload levels at the intermediate devices and/or based on network conditions.

In at least some embodiments, a hash value for the modified segments may be generated at the storage gateway appliance 180, and transmitted to the selected intermediate device, in addition to the modified segments themselves. The intermediate device 130 may validate the contents of the modified segments using the hash value supplied by the appliance. The intermediate device 130 may download the chunk C from the storage service, and an original chunk hash value for the chunk, in the depicted embodiment. In order to reduce or eliminate the chances of undetected data corruption, as described above with respect to FIG. 1, the intermediate device 130 may compute a new chunk hash value in two different ways. In one approach, the new chunk hash value may be computed using the original chunk hash value, the modified segment hash value(s), and the original segment hash value(s). In the second approach, after merging the modified segments with the original chunk, a second chunk hash value may be obtained using the merged version of the chunk. If the two chunk hash values match, this may be considered as verifying that data corruption did not occur during the merge. If the two chunk hash values do not match, corrective actions such as retries may be taken. The validated modified chunk and the corresponding new chunk hash value may be transmitted by the intermediate device 130 to the storage service 220. In at least some embodiments, the intermediate devices 130 may be configured to perform various additional functions, e.g., in response to some client reads, pre-fetch operations may be initiated to transfer as-yet-unrequested segments of a chunk to a storage gateway appliance 280 in anticipation of future read requests.

Data Corruption Possibilities at Intermediate Devices

Figure 3:
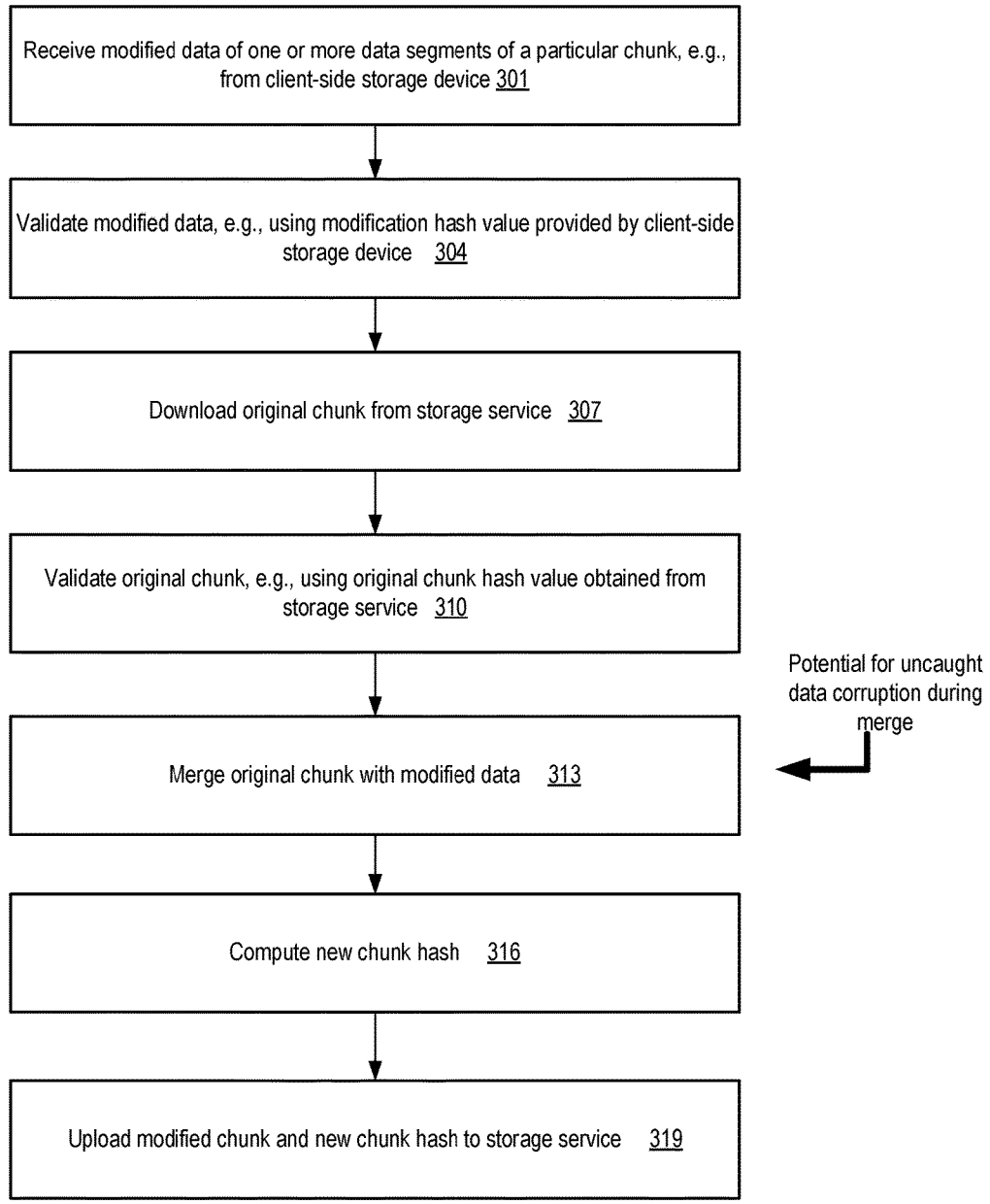
FIG. 3 is a flow diagram illustrating a technique for responding to client-initiated writes that may allow uncaught data corruption to occur.

FIG. 3 is a flow diagram illustrating a technique for responding to client-initiated writes that may allow uncaught data corruption to occur. It is noted that the operations of FIG. 3 are illustrated herein to indicate circumstances under which data corruption may remain undetected, if the data segmented hashing based validation approach described above (and also described below with respect to FIG. 4 onwards) for various embodiments is not adopted. The operations of FIG. 3 are not intended to represent a recommended implementation.

As shown in element 301 of FIG. 3, one or more modified segments S of a given chunk C of a storage object resident at a storage service may be received, e.g., from a client-side storage device such as a storage appliance, at an intermediate device. In environments in which the client-side storage device computes a hash value for the modified segment and transmits such a modification hash value to the intermediate device, the segments received from the client-side storage device may be validated at the intermediate device using the modification hash value (element 304).

The original data chunk C may be downloaded from the storage service to the intermediate device (element 307), and validated using an original chunk hash value that may also be obtained from the storage service (element 310). The original data chunk may then be merged with the modified segments S (element 313), e.g., by replacing the original segments at the corresponding segment offsets of the chunk with the contents of the modified segments. A new chunk hash value may be computed after the merge (element 316), and the merged chunk and the new chunk hash value may be uploaded to the storage service (element 319).

Unfortunately, in the scenario depicted in FIG. 3, if some of the modified data (or any other portions of the chunk C) were corrupted during the merge operation of element 313 (or at any time after the downloaded original chunk was validated), the new chunk hash value generated in the operations corresponding to element 316 would not be helpful in detecting the data corruption, since the new chunk hash value would have been derived from the corrupted data. Accordingly, the approach illustrated in FIG. 3 may result in a corrupted data chunk (and a matching hash value) being uploaded to the storage service. In order to prevent such a scenario, the approach of generating two independently-derived hash values for the modified chunk, described below, and then validating the merged chunk by comparing the two hash values, may be employed in some embodiments.

Methods for Safe Data Modifications

Figure 4:
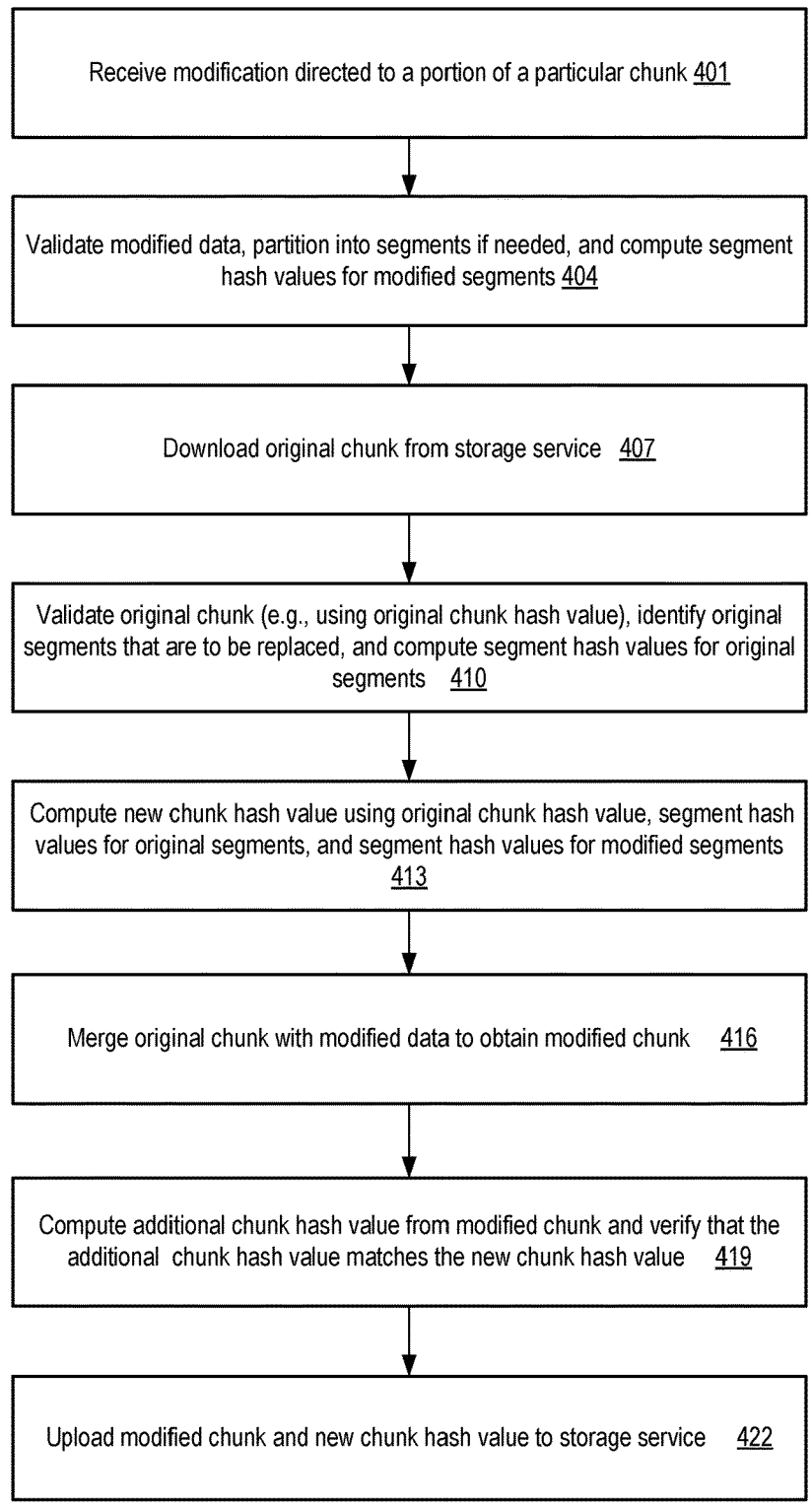
FIG. 4 is a flow diagram illustrating aspects of the operation of an intermediate device configured to respond to client-initiated write operations using a technique that reduces the likelihood of the types of uncaught data corruption illustrated in FIG. 3, according to at least some embodiments.

FIG. 4 is a flow diagram illustrating aspects of the operation of an intermediate device 130 configured to respond to client-initiated write operations using a technique that reduces the likelihood of the types of uncaught data corruption illustrated in FIG. 3, according to at least some embodiments. As shown in element 401 of FIG. 4, a modification request directed at a portion of a data chunk C of a storage object may be received at the intermediate device 130, e.g. from the client-side storage device 280 to which a client 150 submitted a corresponding I/O request directed to the storage object whose primary copy or version is at a remote storage service 220. In some embodiments, if the client's write was directed to more than one segment, the modified segments may be sent as a group, with a corresponding combined hash value for the group of segments, to the intermediate device 130. The intermediate device 130 may validate the received modified segment or segments (e.g., by computing a hash value for the modified data and comparing it with the hash value received from the client-side storage device) (element 404). If the modified data combines more than one segment, the individual segments may be extracted in the depicted embodiment. Hash values for each of the individual modified segments may be computed, e.g., using steps similar to those outlined in FIG. 5 below. The output of the hashing operations on M modified segments may comprise M segment hash values, one for each segment, with all of the individual segment hash values being equal in size at least on some implementations—e.g., a 256-bit hash value may be used for each segment, and 256-bit hash values may also be used for the chunks of the storage object.

The original chunk C (i.e., the version of the chunk C that was written most recently at the storage service 220) may be downloaded to the intermediate device 130 (element 407) in the depicted embodiment. At least in some embodiments, an original chunk hash value may also be downloaded. The original chunk C may be validated, e.g., using the original chunk hash value downloaded from the storage service 220 (element 410). In addition, in the depicted embodiment, the original segments that are to be overwritten as a result of the client's modification may be extracted from the original chunk C, and corresponding original segment hash values may be computed (as also indicated in element 410). Thus, after the operations of element 410 are complete, the following may be available at the intermediate device 130 (e.g., in a memory of the intermediate device) in the depicted embodiment: (a) the original chunk (b) the original chunk hash value (c) the original segments to be modified (extracted from the original chunk) (c) the modified segments received from the client-side storage device (d) the computed segment hash values of the original segments and (e) the computed segment hash values of the modified segments.

As indicated in element 413, the intermediate device 130 may then compute a new chunk hash value using the original chunk hash value, the original segment hash values, and the modified segment hash values in the depicted embodiment. As described below in further detail, logical operations to eliminate the contribution of the original segments to the original chunk hash value may be performed, and then logical operations to add in the contribution of the modified segments may be performed, to arrive at the new chunk hash value in some embodiments. The modified segments may be merged with the original chunk (element 416) to generate a modified version of the chunk.

In at least some embodiments, another chunk hash value may be computed from the modified chunk (element 419), and this additional chunk hash value may be compared with the previously generated new chunk hash value to validate the merged chunk. If both chunk hash values match, the merge may be deemed free of data corruption. If the chunk hash values do not match, corrective actions such as retries may be attempted in some embodiments. After validation, the modified chunk and its corresponding new chunk hash value may be uploaded to the storage service 220 in the depicted embodiment (element 422). In some embodiments, the storage service 220 rather than the intermediate device 130 may be responsible for validating the merged data chunk—e.g., the additional chunk hash value may be generated at the storage service after the merged chunk is received, and compared at the storage service with the new chunk hash value provided by the intermediate device, to validate the merged chunk.

Figure 5:
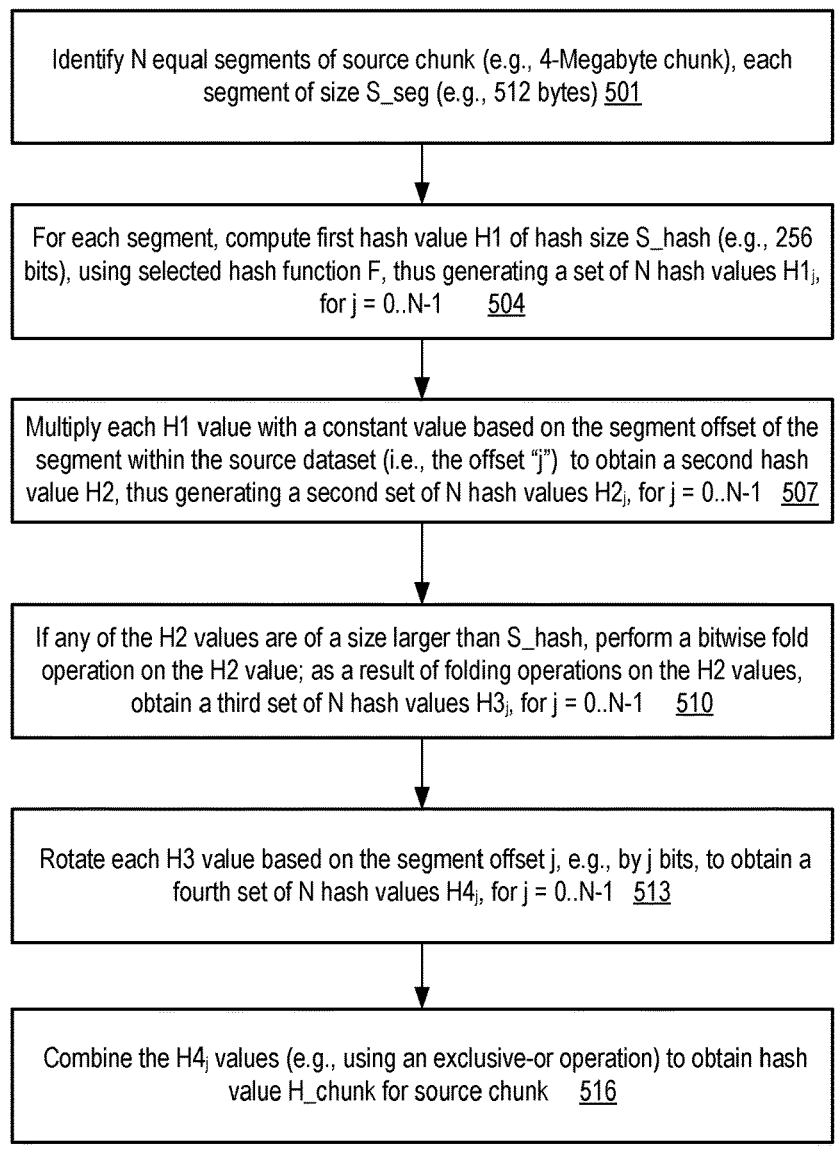
FIG. 5 is a flow diagram illustrating example operations that may be used to obtain a hash value for a data chunk using segmented hashing, according to at least some embodiments.

FIG. 5 is a flow diagram illustrating example operations that may be used to obtain a hash value for a data chunk using segmented hashing, according to at least some embodiments. A concrete example of the application of the techniques of FIG. 5 to a small source data set (i.e., a small chunk) is provided in FIGS. 6A and 6B. A technique similar to that illustrated in FIG. 5 may be employed on any collection of source data comprising one or more segments, and at various points along the data path from the client-side storage device 140 or appliance 280 to the storage repository 120 or storage service 220 in different embodiments. For example, such a technique may be used at the intermediate device 130 to compute the additional chunk hash value determined in element 419 of FIG. 4, or such a technique may be employed at the client-side storage device to generate the hash value for a modified set of segments, or such a technique may be employed at the storage service if and when a chunk hash value needs to be computed at the storage service. At least in some embodiments, the same hash computation technique may be employed throughout the system of FIG. 1 and/or FIG. 2, so that a consistent hash value is obtained for the same source data, regardless of the specific device (e.g., a client-side storage device, an intermediate device, or a device of the storage service) at which the hash value is generated. In one embodiment, all the operations illustrated in FIG. 5 may be performed during a single pass through the source data.

In the depicted embodiment, the overall goals of the illustrated hash value determination technique for given source data (e.g., a chunk, or one or more segments) may include some combination of the following: (a) the computation cost of generating the hash value should be kept reasonably low (b) it should be very difficult to generate the source data from the hash value generated for the source data (c) if the source data changes even slightly, this should result in a substantial change to the hash value (d) two different source datasets should not generate the same hash values (e) when the source data includes a plurality of segments, each segment should contribute to the final hash value for the combined source data in such a way that the position of the segment within the source data does not affect the extent of the influence of the segment on the final hash value (f) when the source data includes a plurality of segments, it should be possible to easily eliminate the contribution of a given segment to the final hash value for the combined source data and (g) when the source data includes a plurality of segments, it should be possible to easily add in the contribution of a given segment to a hash value for the remaining segments, to arrive at the final hash value for the combined source data.

In the embodiment illustrated in FIG. 5, the technique for computing the hash value for a chunk C begins with an identification of N equal-sized segments of C, each segment of size S_seg (as shown in element 501 of FIG. 5). For example, if the chunk size is 4000 kilobytes, and S_seg is 512 bytes, 8000 segments may be identified. For each segment, a first hash value of size S_hash may be computed using a hash function F (element 504). For example, in some embodiments a Secure Hash Algorithm (SHA) cryptographic hash function, such as SHA-256 (with S_hash=256 bits), SHA-512, or SHA-384 may be used. Other types of hash functions F may be used in other embodiments. As a result of the invocation of hash function F, a set of N first intermediate hash values, which may be referred to as $H1_j$, for $j=0 \ldots (N-1)$ may be computed. The function F may be selected to support, for example, desired properties (a), (b), (c) and (d) listed above.

After the H1 values have been computed, each H1 value (except the very first H1 value) may be multiplied by a constant in the depicted embodiment to arrive at a second set of intermediate hash values HZ, for $j=0 \ldots (N-1)$. The constant to be used for a given segment at segment offset j may itself be the product of some selected prime number (e.g., "13") and the segment offset j in some implementations. Thus, the relative position of the segment may contribute to the H2 value determined for the segment. As a result of multiplication by the position-based constant, even if two different segments had identical source data to begin with, and as a result had identical H1 values, the H2 values of the segments would differ. Operations involved in the computation of the H2 values are indicated in element 507 of FIG. 5. It is noted that at least in some implementations, the first H1 value ($H1_0$) may be left unchanged during the multiplication step, so that $H2_0=H1_0$.

Next, in the depicted embodiment, each H2 value may be checked to see whether its size exceeds S_hash. For example, if S_hash is set to 256 bits, the multiplication corresponding to element 507 of FIG. 5 may result in a particular H2 value such as $H2_k$ that occupies 264 bits, which exceed the 256-bit hash size limit. For any H2 values that exceed the hash size limit, the extra bits (e.g., the leftmost bits) may be folded in with the other bits using a bitwise folding operation in the depicted embodiment. In a bitwise folding operation in which the source occupies m bits and the desired size is p bits, the (m-p) leftmost bits may be removed and added to the (m-p) rightmost bits, for example (a concrete example of such bitwise folding is described below in reference to FIG. 6A). In some cases, none of the H2 values may exceed the S_hash size limit, in which case no folding may be required. As a result of the check for S-hash size limit violations, and the corresponding bitwise fold operations (if any are needed), a set of N values $H3_j$, for $j=0 \ldots (N-1)$ may be obtained in the depicted embodiment, as shown in element 510 of FIG. 5. The folding operation (as opposed to, for example, discarding the excess bits) may ensure that the full contribution of each segment is retained during this stage of the computation, regardless of the size of the result of the multiplication.

As shown in element 513 of FIG. 5, each of the H3 values may then be rotated by a number of bits equal to the corresponding segment offset, i.e., each $H3_j$ value may be rotated by j bits to arrive at a corresponding $H4_j$ value, for $j=0 \ldots (N-1)$. Such a rotation may ensure that even if two H3 values for different segments were the same, the corresponding H4 values would differ. After the rotation, the final hash value H_chunk for the chunk as a whole may be computed by combining the segment hash values H4, e.g., by performing an XOR with all the H4 values as operands (element 516 of FIG. 5). It is noted that although the operations illustrated in FIG. 5 have been described in the context of chunks of storage objects, where each chunk can be partitioned into segments, the illustrated approach may be applied in other contexts as well, in which a hash or checksum value for a larger object is to be generated in such a way that the contributions of portions of the object to the hash value may need to be separated. Operations other than XOR may be use to combine the contributions of the individual segment hash values (the H4 values) in some embodiments. In at least one embodiment, the computations of the H1, H2, H3 and H4 values, as well as the H_chunk value, may all be completed within a single pass through the source data, i.e., any given source segment may have to be read only once during the entire process of obtaining H_chunk.

FIG. 6A and FIG. 6B collectively illustrate a use of the techniques illustrated in FIG. 5 on a small example data set, according to at least some embodiments. The example source data set or chunk comprises a sequence of 40 hexadecimal symbols "000102030405060708090A0B0C0D0E0F10111213", as shown in element 601 of FIG. 6A. Two hexadecimal symbols can be represented by one byte, so the example chunk occupies 20 bytes. The segment size in the provided example, S_seg, is 4 bytes, so the chunk can be divided into 5 data segments (i.e., N=5). The segments are identified as $S_0$, $S_1$, $S_2$, $S_3$, and $S_4$, as shown. A very small source data set and a very small segment size have been chosen in this example for ease of explanation, so that the computations shown in each step can be checked without much difficulty. In an actual implementation of a storage system, the chunks (and segments) may typically be much larger, although the techniques shown are applicable to arbitrary sizes of chunks and segments, as long as the chunk size is a multiple of the segment size.

After the segments of the chunk have been identified, a hash function F may be applied to each segment to determine the H1 values (element 604 of FIG. 6A). In this example, the identity function has been chosen as the hash function, again for ease of explanation. The identity function returns the same value as the argument supplied to it, so F(x)=x in this example. Therefore, the $H1_j$ value for a given value of j is the same as $S_j$ (the original segments), as shown in element 604. The size of the hash value, S_hash, is also the same as the size of the source segments in this example, i.e., 4 bytes (8 hexadecimal symbols).

Each H1 value, except $H1_0$, is then multiplied by a constant based on the segment index j, to determine a corresponding H2 value. The constant is selected as the product of a small prime number (7 in this example) and j, as shown in element 607 of FIG. 6A. The HZ values for j=0, j=1, j=2, and j=3 all fit within the 4 bytes S_hash size limit. However, as shown, $H2_4$ (01C1DDFA14) takes up 5 bytes. The first byte "01" (00000001 in bit format) of may be referred to as the "excess bits" of $H2_4$.

Accordingly, in order to conform to the 4-byte S_hash size restriction, a bit-wise folding operation of the excess bits may be performed, as indicated in element 610, to arrive at the H3 values from the H2 values. In the case of $H2_4$, the number "01" formed by the excess bits is added to the number represented by the remaining bits "C1DDFA14" to arrive at H34=C1DDFA15. All the other H3 values, for j=0 . . . 3, remain unchanged from the corresponding H2 values in the bitwise folding operations illustrated in element 610, because they did not exceed the S_hash size limit of 4 bytes each.

Each of the H3 values is then bit-wise rotated by the number of bits equal to the segment offset j of the value, to obtain a corresponding H4 value, as shown in element 613 of FIG. 6B. Since the segment offset of $H3_0$ is 0, $H4_0$ is equal to $H3_0$ (i.e., a rotation by 0 bits is the same as no rotation, and so does not change $H3_0$). In element 613, the value of $H3_1$ is shown in bit format, and the result of its rotation by one bit is also shown in bit format, to clarify how the hexadecimal value for $H4_1$ is obtained. Finally, as shown in element 616 of FIG. 6B, the $H4_j$ values for j=0 . . . (N−1) may all be combined, e.g., using the exclusive-or operator, to arrive at the hash value H_chunk for the source chunk.

Figure 7:
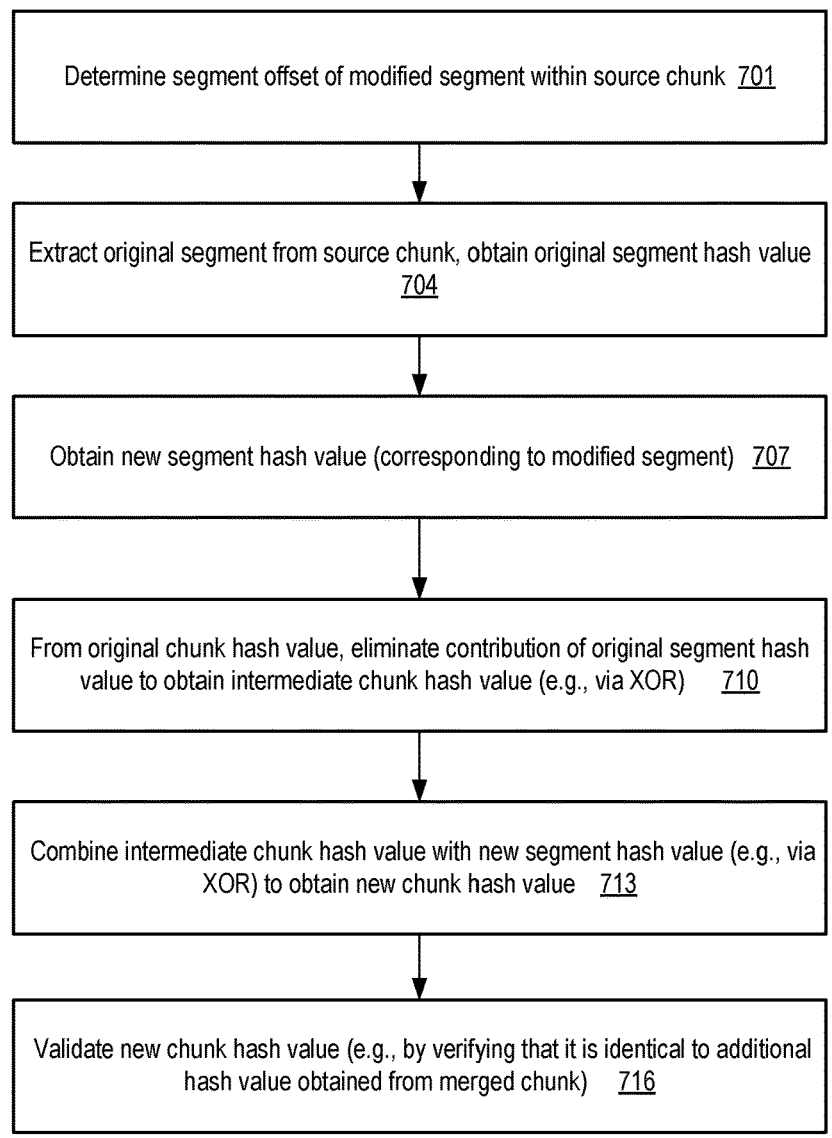
FIG. 7 is a flow diagram illustrating example operations that may be used to determine a hash value for a modified data chunk using segment hash values of the modified segments of the chunk, according to at least some embodiments.

FIG. 7 is a flow diagram illustrating example operations that may be used to determine a hash value for a modified data chunk using a segment hash value of the modified segment of the chunk, according to at least some embodiments. The technique illustrated in FIG. 7 may be used to obtain the new chunk hash value at the intermediate device, e.g., in operations corresponding to element 413 of FIG. 4 in some embodiments. It is noted that although the example operations are illustrated for a single modified segment in FIG. 7, a similar approach may be taken when the modification comprises a plurality of segments. As shown in element 701, the segment offset of the modified segment (the "j" value of the modified segment, in the context of the notation used in FIG. 5 and FIG. 6A-6B) may be determined. The client that requests the modification may specify the offset within the chunk (or within the storage object as a whole) at which the modification is to be performed in the depicted embodiment, and the segment offset may be computed from the client-provided offset.

The original segment, which is to be replaced as a result of the client's request, may be extracted from the original chunk (element 704), and its hash value (i.e., its H4 value according to the notation of FIG. 5) may be computed at the intermediate device in the illustrated embodiment. The hash value for the original segment may be referred to as the original segment hash value. As shown in element 707, the hash value (the H4 value) corresponding to the modified segment may also be obtained. In some implementations, the hash value of the modified segment may be provided to the intermediate device 130 by the client-side storage device, and as a result, the computation at the intermediate device of the modified segment hash value may not be required in such cases.

At this stage, the following hash values are available at the intermediate device: the original chunk hash value, the original segment hash value, and the modified segment hash value. In embodiments in which the chunk hash value is obtained using an XOR of the segment hash values, the intermediate device 130 may be able to take advantage of some of the properties of the XOR operation to eliminate the effect of the original segment on the chunk hash value. For example, one of the XOR operation's properties is that an XOR of a value with itself results in 0, i.e., A XOR A=0. Another property of XOR is that an XOR of a given value with 0 results in the given value (i.e., that an XOR with 0 is the same as the identity function). Finally, the XOR operation is commutative and associative. Therefore, to eliminate the effect of one of the H4 values (e.g., $H4_k$) on the hash chunk value H_chunk that was obtained by XORs of all the H4 values, it suffices to perform another XOR, of H_chunk with $H4_k$. Consider the following simple example: H_chunk=$H4_0$ XOR $H4_1$ XOR $H4_2$. If the effect of $H4_2$ is to be eliminated, another XOR with $H4_2$ would suffice, yielding $$H\_chuck\_with\_H4_2\_contribution\_elminated =$$
$$H4_0 XOR H4_1 XOR H4_2 XOR H4_2 = H4_0 XOR H4_1 XOR (H4_2 XOR H4_2) =$$
$$H4_0 XOR H4_1 XOR 0 = H4_0 XOR H4_1$$

As shown in element 710, the contribution of the original segment hash to the chunk value may be eliminated, for example using an XOR operation with the original chunk hash value and the original segment hash value as operands. Next, as shown in element 713, the contribution of the modified segment hash value may be added in, e.g., by an XOR with the modified segment hash value. It is noted that operations other than XOR may be used in some embodiments, as long the logical elimination of the contribution of a segment's hash value to the chunk's hash value is feasible efficiently, and as long as the effect on the chunk's hash value of adding a new segment to the chunk can be determined reasonably efficiently. The new chunk hash value obtained as a result of the use of the original and modified segment hash values may be validated in some embodiments (element 716), e.g., by computing an additional hash value starring with the merged chunk as the source data and using the techniques illustrated in FIG. 5. Thus, hash values for the modified chunk may be obtained in two different ways, and compared with one another to ensure that data corruption that may have occurred during or prior to the merge does not go undetected in some embodiments. One chunk hash value may be obtained via a set of computations starting with the modified chunk, and the second chunk hash value may be obtained via another set of computations using the original chunk hash value and the segment hash values of the original and modified segments.

Figure 8:
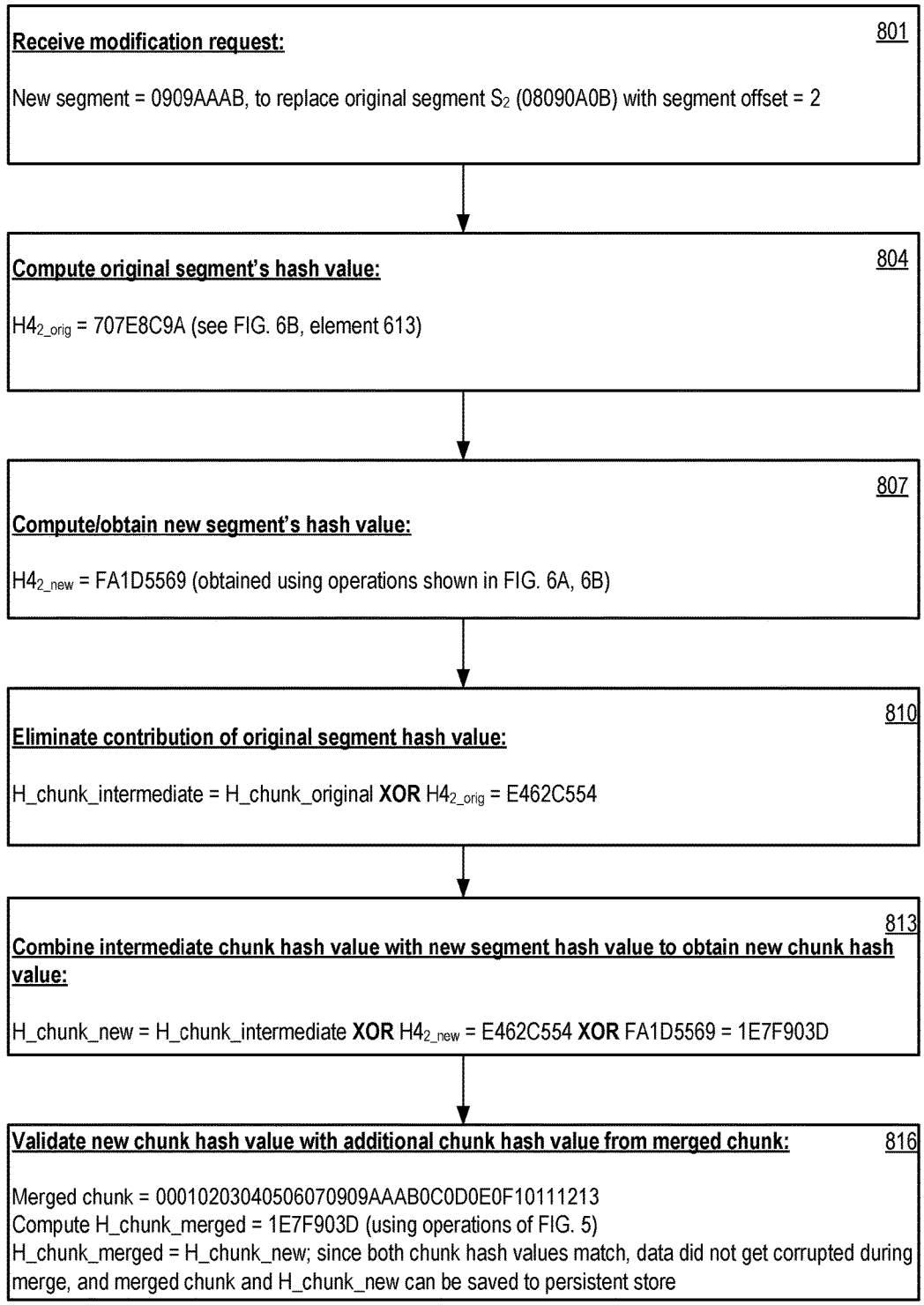
FIG. 8 illustrates a use of the techniques illustrated in FIG. 7 on the example dataset of FIG. 6A and FIG. 6B, according to at least some embodiments.

FIG. 8 illustrates a use of the techniques illustrated in FIG. 7 on the example dataset of FIG. 6A and FIG. 6B, according to at least some embodiments. As shown in element 801 of FIG. 8, a request may be received to replace the segment $S_2$ (with segment offset 2), whose original value in FIG. 6A was 08090A0B, with a modified segment 0909AAAB. The modified segment may be sent to the intermediate device from the client-side storage device where the write request was received. At the intermediate device, the original segment may be retrieved from its containing chunk, and the original segment's hash value $H4_{2\_orig}$ may be computed (element 804) using the techniques of FIG. 5. The segment hash value $H4_{2\_new}$ for the modified segment may also be computed using similar techniques, as indicated in element 807.

The contribution of the original segment to the original chunk hash value may then be eliminated, e.g., using an XOR operation with the original chunk hash value and the original segment hash value as operands, as illustrated in element 810. The result of this computation is termed H_chunk_intermediate in element 810 of FIG. 8. Next, a computation to add in the contribution of the modified segment may be performed, e.g., using an XOR operation with H_chunk_intermediate and $H4_{2\_new}$ as operands, as illustrated in element 813, resulting in the new chunk hash value H_chunk_new. To ensure that data corruption did not occur, an additional chunk hash value may be computed using operations similar to those of FIG. 5, starting with the merged chunk as the source data. If the chunk hash values computed using both methods match, the merge may be deemed error-free (element 816), and the merged chunk and its chunk hash value may be transmitted to the storage service.

In some embodiments, the client-side storage device that received the client's write request may itself compute $H4_{2\_new}$ and transmit it to the intermediate device 130, where $H4_{2\_new}$ may be used to validate the contents of modified segment. In such a scenario, computation of $H4_{2\_new}$ may not be required at the intermediate device. In addition, at least in some implementations, the XOR operations between H_chunk_original, $H4_{2\_orig}$ and $H4_{2\_new}$ may be combined into a single computation. In some implementations, depending for example on the total number of segments in a chunk and/or on the number of non-zero segments in a chunk, the original segment hash values may be provided to the intermediate device 130 (e.g., from the storage service 220) in additional to the original chunk hash value. Similarly, in some implementations, when a client's write request encompasses more than one segment, the client-side storage device may send the combined hash value for the written segments, as well as the individual hashes for each modified segment, to the intermediate device, thus reducing the number of hash computations that may need to be performed at the intermediate device.

In at least some embodiments, the segment hash values that are computed for the avoidance of undetected data corruption using the techniques described above may also be used for other purposes. For example, the segment hash values may be used for de-duplication in some scenarios. Instead of sending an actual modified segment to the intermediate device 130 over a potentially slow or expensive network path, in one embodiment the client-side storage device such as a gateway appliance 280 may first send the (typically much smaller) segment hash value to the intermediate device. The intermediate device may perform a lookup, using the segment hash value, in a data dictionary set up for de-duplication purposes. A determination may thus be made as to whether the modified segment contents are already available at the intermediate device and/or at the storage service. If the dictionary lookup results in a hit, it may be possible to avoid transmitting the modified segment from the client-side storage device to the intermediate device in such an embodiment.

Figure 9:
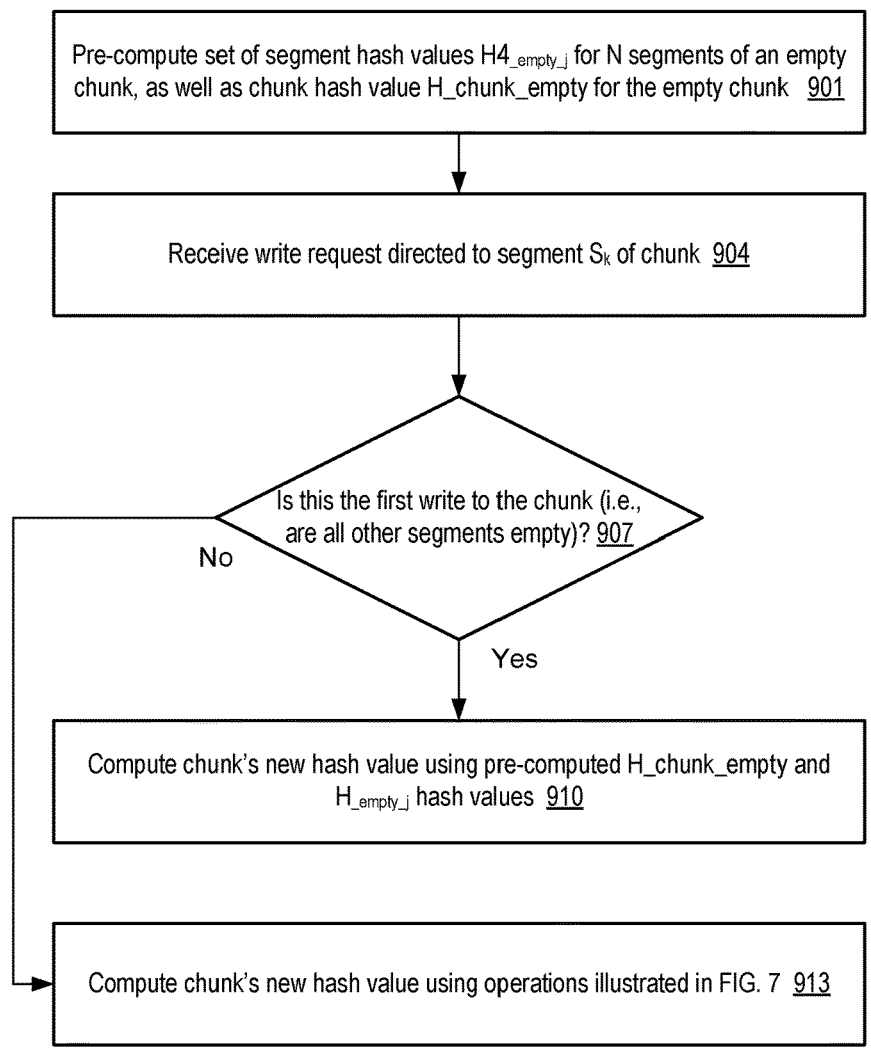
FIG. 9 illustrates aspects of example operations that may be performed to optimize the generation of a chunk hash value in response to an initial write of a previously empty chunk, according to at least some embodiments.

In some embodiments, the generation of chunk hash values for sparsely-populated chunks (i.e., chunks that are mostly empty, or completely empty prior to the received write request) may be further optimized by using pre-computed hash values. FIG. 9 illustrates aspects of example operations that may be performed to optimize the generation of a chunk hash value in response to an initial write of a previously empty chunk, according to at least some embodiments. As shown in element 901 of FIG. 9, segment hash values may be pre-computed for each segment of an empty chunk, together with a chunk hash value H_chunk_empty for the entire empty chunk. Note that depending on the implementation, the segments of an "empty" or unused chunk may be initialized with various contents—e.g., in one implementation, one or more "invalid data" patterns may be used to fill empty segments, or at least some segments may be filled with zeroes.

When a write request is received, directed to a particular segment $S_k$ of a an empty chunk (element 904), a determination as to whether this is the first write to the chunk may be made (element 907). If it is the first write, the pre-computed hash values for the original segment and the empty chunk may be used to determine the new hash value (element 910), so that some of the hash value computations illustrated in FIG. 7 may be avoided. If it is not the first write to the chunk, the operations illustrated in FIG. 7 may be performed in some embodiments (element 913). In other embodiments, the pre-computed segment hash values for empty segments may also be used in at least those cases where it is possible to determine that the targeted segment was empty prior to the requested write, e.g., if the chunk is sparsely populated and a bitmap indicating which segments are empty is available.

It is noted that in some embodiments, at least some of the operations illustrated in the flow diagrams above (e.g., FIG. 5, FIG. 7, or FIG. 9) may be performed in an order different from that shown, or in parallel with other operations. In some implementations, for example, the hash values such as H1, H2, H3 or H4 may be computed in parallel for different segments. Some of the illustrated operations may be omitted in some implementations.

Use Cases

The techniques described above, of substantially reducing the chances of data corruption during writes using segmented hashing, may be beneficial in any storage environment in which read-modify-write operations are implemented (e.g., where an existing version of data has to be read from a repository before changes to the data can be made persistent), and in which the units in which data can be written by clients may differ from the units in which the data is natively stored in the data repository. In particular, in scenarios in which client-generated updates have to be staged and/or manipulated, for example for performance reasons, along the path between the client and a storage service, data corruption may be possible at the staging sites (such as corruption due to possible bugs at the intermediate devices described above). The use of segmented hashing to validate that merged updates are error-free may be especially useful in such scenarios.

Illustrative Computer System

Figure 10:
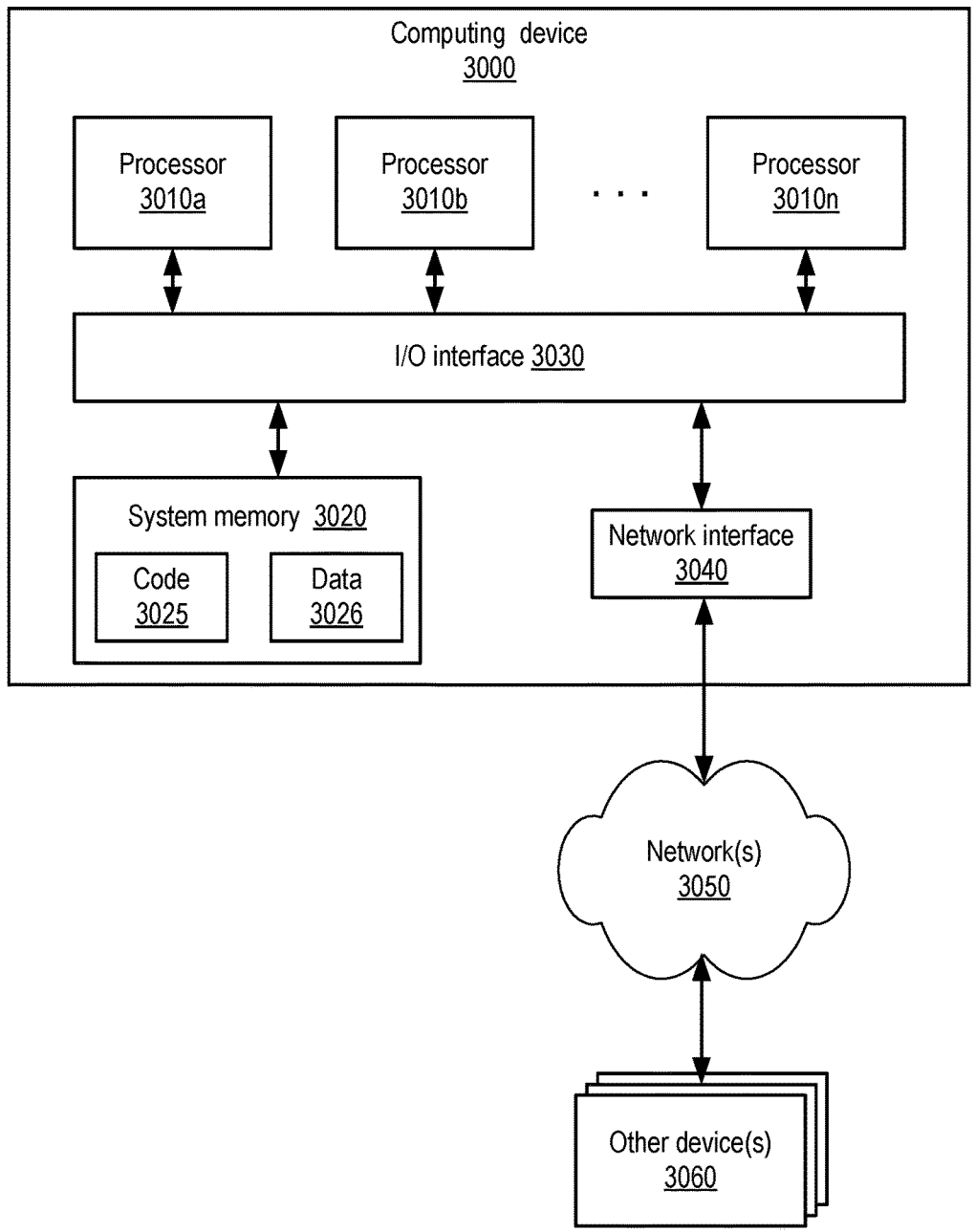
FIG. 10 is a block diagram illustrating an example computing device that may be used in at least some embodiments.

In at least some embodiments, a server that implements a portion or all of one or more of the technologies described herein, including the techniques to implement the functionality of the intermediate devices 130, the storage service 220, and/or the client-side storage devices 140 or appliances 280, may include a general-purpose computer system that includes or is configured to access one or more computer-accessible media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 9, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
identifying, by a computing device, a number of segments of a data chunk;
generating, by the computing device, hash values for respective segments of the data chunk;
generating, by the computing device, intermediate hash values for the respective segments at least by multiplying the hash values by respective values;
in response to determining that one or more of the intermediate hash values exceeds a size limit, generating, by the computing device, other intermediate hash values for the respective segments based on the intermediate hash values for the respective segments, wherein the other intermediate hash values do not exceed the size limit;
generating, by the computing device, additional intermediate hash values for the respective segments by rotating individual ones of the other intermediate hash values by a respective number of bits; and
generating, by the computing device, a hash value for the data chunk based on the additional intermediate hash values for the respective segments.

2. The method as recited in claim 1, further comprising:
for a given segment, generating the intermediate hash value based at least on a position of the segment within the data chunk.

3. The method as recited in claim 2, further comprising:
for the given segment, generating the intermediate hash value based at least on multiplying a prime number by an offset of the segment within the data chunk.

4. The method as recited in claim 1, further comprising:
generating one or more of the other intermediate hash values by performing a bitwise folding operation on the one or more intermediate hash values that exceed the size limit.

5. The method as recited in claim 1, further comprising:
generating the hash value for the data chunk by performing at least an exclusive or operation with the additional intermediate hash values for the respective segments as operands.

6. The method as recited in claim 1, further comprising:
identifying the number of segments of the data chunk as equal-sized segments.

7. The method as recited in claim 1, further comprising:
generating the hash values for one or more of the respective segments of the data chunk by performing a secure hash algorithm (SHA) cryptographic function.

8. A system comprising one or more computing devices, wherein the one or more computing devices are configured to:
identify a number of segments of a data chunk;
generate hash values for respective segments of the data chunk;
generate intermediate hash values for the respective segments at least by multiplication of the hash values by respective values;
in response to a determination that one or more of the intermediate hash values exceeds a size limit, generate other intermediate hash values for the respective segments based on the intermediate hash values for the respective segments, wherein the other intermediate hash values do not exceed the size limit;
generate additional intermediate hash values for the respective segments by rotation of individual ones of the other intermediate hash values by a respective number of bits; and
generate a hash value for the data chunk based on the additional intermediate hash values for the respective segments.

9. The system as recited in claim 8, wherein the intermediate device is further configured to:
for a given segment, generate the intermediate hash value based at least on an offset of the segment within the data chunk.

10. The system as recited in claim 9, wherein the intermediate device is further configured to:
for the given segment, generate the intermediate hash value based at least on multiplication of a number with the offset of the segment within the data chunk.

11. The system as recited in claim 8, wherein the intermediate device is further configured to:
generate one or more of the other intermediate hash values by performance of a bitwise folding operation on the one or more intermediate hash values that exceed the size limit.

12. The system as recited in claim 8, wherein the intermediate device is further configured to:
generate the hash value for the data chunk by performance of at least an exclusive or operation with the additional intermediate hash values for the respective segments as operands.

13. The system as recited in claim 8, wherein the intermediate device is further configured to:
identify the number of segments of the data chunk as equal-sized segments.

14. The system as recited in claim 8, wherein the intermediate device is further configured to:
generate the hash values for one or more of the respective segments of the data chunk by performance of a secure hash algorithm (SHA) cryptographic function.

15. A non-transitory computer-accessible storage medium storing program instructions that when executed on one or more processors:
identify a number of segments of a data chunk;
generate hash values for respective segments of the data chunk;
generate intermediate hash values for the respective segments at least by multiplication of the hash values by respective values;
in response to a determination that one or more of the intermediate hash values exceeds a size limit, generate other intermediate hash values for the respective segments based on the intermediate hash values for the respective segments, wherein the other intermediate hash values do not exceed the size limit;
generate additional intermediate hash values for the respective segments by rotation of individual ones of the other intermediate hash values by a respective number of bits; and
generate a hash value for the data chunk based on the additional intermediate hash values for the respective segments.

16. The storage medium as recited in claim 15, wherein the instructions when executed at the one or more processors:
for a given segment, generate the intermediate hash value based at least on a position of the segment within the data chunk.

17. The storage medium as recited in claim 16, wherein the instructions when executed at the one or more processors:
  for the given segment, generate the intermediate hash value based at least on multiplication of a prime number by an offset of the segment within the data chunk.

18. The storage medium as recited in claim 15, wherein the instructions when executed at the one or more processors:
  generate one or more of the other intermediate hash values by performance of a bitwise folding operation on the one or more intermediate hash values that exceed the size limit.

19. The storage medium as recited in claim 15, wherein the instructions when executed at the one or more processors:
  generate the hash value for the data chunk by performance of at least an exclusive or operation with the additional intermediate hash values for the respective segments as operands.

20. The storage medium as recited in claim 15, wherein the instructions when executed at the one or more processors:
  identify the number of segments of the data chunk as equal-sized segments.

* * * * *